United States Patent
Yokiel et al.

(10) Patent No.: US 10,352,497 B2
(45) Date of Patent: Jul. 16, 2019

(54) STABILIZING MOUNT

(71) Applicant: GCO Outdoor Solutions, LLC, Winchester, VA (US)

(72) Inventors: Joseph Paul Yokiel, Carmichaels, PA (US); Joseph Paul Yokiel, II, Winchester, VA (US)

(73) Assignee: GCO Outdoor Solutions, LLC, Winchester, VA (US)

( * ) Notice: Subject to any disclaimer, the term of this patent is extended or adjusted under 35 U.S.C. 154(b) by 40 days.

(21) Appl. No.: 15/889,629

(22) Filed: Feb. 6, 2018

(65) Prior Publication Data

US 2018/0224062 A1    Aug. 9, 2018

Related U.S. Application Data

(60) Provisional application No. 62/455,652, filed on Feb. 7, 2017.

(51) Int. Cl.
| | |
|---|---|
| *F16M 11/20* | (2006.01) |
| *F41A 23/06* | (2006.01) |
| *F41A 23/16* | (2006.01) |

(52) U.S. Cl.
CPC ..... *F16M 11/2064* (2013.01); *F16M 11/2021* (2013.01); *F41A 23/06* (2013.01); *F41A 23/16* (2013.01)

(58) Field of Classification Search
CPC ......... F41A 23/04; F41A 23/06; F16M 11/10; F16M 11/2021; F16M 11/2064
USPC .............. 42/94; 89/37.04; 248/276.1, 278.1, 248/279.1, 282.1, 284.1, 286.1, 291.1
See application file for complete search history.

(56) References Cited

U.S. PATENT DOCUMENTS

| | | | |
|---|---|---|---|
| 790,217 A | 5/1905 | Mason | |
| 4,562,987 A * | 1/1986 | Leeds | F16M 11/048 248/278.1 |
| 4,854,066 A | 8/1989 | Canterbury, Sr. | |
| 5,491,920 A | 2/1996 | McCullers | |
| 5,553,820 A * | 9/1996 | Karten | A47B 21/0314 248/181.2 |
| 5,626,322 A | 5/1997 | Braun | |
| 5,931,102 A * | 8/1999 | Grahl | A47B 17/033 108/143 |
| 5,988,573 A * | 11/1999 | Mueller | F16M 11/242 248/161 |
| 6,244,759 B1 | 6/2001 | Russo | |
| 6,283,428 B1 | 9/2001 | Maples et al. | |
| 6,450,462 B1 * | 9/2002 | Hsieh | G10D 13/026 248/125.1 |
| 6,484,987 B2 | 11/2002 | Weaver | |
| 6,729,592 B1 | 5/2004 | Kurtts | |

(Continued)

*Primary Examiner* — Jonathan Liu
*Assistant Examiner* — Guang H Guan
(74) *Attorney, Agent, or Firm* — Benjamin C. Rothermel, Esq.

(57) ABSTRACT

The present invention relates to a stabilizing mount, the stabilizing mount including a cylindrical element and a leveling system adjustably connected to the cylindrical element. The leveling system includes a sleeve adjustably connected to the cylindrical element, wherein the sleeve can be adjusted 360 degrees about the cylindrical element and a first arm adjustably connected to the sleeve, wherein the first arm can be adjusted at least 180 degrees about a connector disposed through the sleeve. The leveling system further includes a mount connector.

7 Claims, 14 Drawing Sheets

(56) References Cited

U.S. PATENT DOCUMENTS

| | | | |
|---|---|---|---|
| 7,207,531 B2 * | 4/2007 | Piontkowski | F16M 11/14 |
| | | | 248/122.1 |
| 7,415,790 B1 | 8/2008 | Ruhland et al. | |
| 7,658,140 B2 | 2/2010 | Lombardi | |
| 7,770,319 B2 | 8/2010 | McDonald | |
| 7,771,131 B2 | 8/2010 | Scott | |
| 7,810,773 B2 * | 10/2010 | Chi | F16M 11/2064 |
| | | | 248/121 |
| 7,958,663 B2 | 6/2011 | Saunders, III | |
| 8,056,874 B2 | 11/2011 | Goodwin et al. | |
| 8,141,827 B2 * | 3/2012 | Lin | F16M 11/242 |
| | | | 248/170 |
| 8,162,271 B2 * | 4/2012 | Li | F16M 11/105 |
| | | | 248/162.1 |
| 8,166,695 B2 | 5/2012 | Pippin | |
| 8,549,786 B1 | 10/2013 | Griffith | |
| 8,683,909 B1 | 4/2014 | Copus | |
| 9,097,277 B2 * | 8/2015 | Johnson, Sr. | F16C 11/04 |
| 9,746,128 B2 * | 8/2017 | Huang | F16M 11/2014 |
| 2004/0216351 A1 | 11/2004 | Eppard et al. | |
| 2007/0102607 A1 * | 5/2007 | Koh | F16M 11/10 |
| | | | 248/276.1 |
| 2008/0164395 A1 * | 7/2008 | Chang | F16M 11/105 |
| | | | 248/276.1 |
| 2009/0212184 A1 * | 8/2009 | Bourgeois | F16M 11/10 |
| | | | 248/288.11 |
| 2010/0102184 A1 | 4/2010 | Gorsuch et al. | |
| 2010/0236125 A1 | 9/2010 | Morrow et al. | |
| 2012/0017485 A1 | 1/2012 | Kern | |
| 2013/0145671 A1 | 6/2013 | Cavell | |
| 2018/0224062 A1 * | 8/2018 | Yokiel | F41A 23/06 |

\* cited by examiner

STABILIZING MOUNT

CROSS REFERENCE TO RELATED APPLICATION

This application claims the benefit of U.S. Provisional Patent Application No. 62/455,652, filed on Feb. 7, 2017, which is hereby incorporated by reference for all purposes as if fully set forth herein.

BACKGROUND

Field

Exemplary embodiments of the present invention relate to an adjustable stabilizing mount for a device.

Discussion of the Background

It may be desirable to mount a device, such as a weapon, to a structure so as to allow the device to be aimed or pointed in many directions. By mounting the weapon or other device to a structure, it can be stabilized for more accurate and effective aiming or pointing. The weapon or other device may also need to be level along a plane horizontal with the earth's surface or aligned to be parallel or close to parallel to the horizon, in order for a user to conveniently and effectively aim or point the device towards an intended target. However, in many situations it is not possible to both mount a device to an existing structure as well as level it with respect to the horizon.

Conventionally, a device may be attached to a tripod or bipod in order to stabilize the device, which also provides a way to level the device. A tripod or bipod requires a substantially horizontal surface, which may not be available for a user deploying a device. Further, a tripod or bipod may allow a user to only aim or point an attached device within a limited range on a single axis, without requiring the tripod or bipod to be repositioned. For example, if a user wanted to increase or decrease the elevation of the device to be aimed or pointed, the tripod/bipod would need to be repositioned at a higher or lower elevation, if that is even possible. Even if such repositioning were possible, it may require a significant number of steps or movements to effectuate such repositioning.

Further, if an attachment is used in combination with the tripod/bipod, although such combination may allow increased up/down or left/right movement, a user may still need to reposition relative to the tripod/bipod in many instances in order to reposition the device. Thus, there is a need for a device that allows repositioning thereof without any similar significant repositioning of the user, and that maintains a significant range of motion from a substantially same user position.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a mount for a device that connects to a surface regardless of its angle of inclination, the pitch of the mount being adjustable so as to level the mount along a horizontal plane.

Exemplary embodiments of the present invention also provide a mount for a device that connects to a surface, and the device may be positioned at any rotational angle regardless of where the mount is connected to the surface.

Exemplary embodiments of present invention also provide a mount for a device that may be articulated around a user so as to minimize the need for the user to reposition relative to the mount while using the mount.

Additional features of the invention will be set forth in the description which follows, and in part will be apparent from the description, or may be learned by practice of the invention.

An exemplary embodiment of the present invention discloses a stabilizing mount for being removably attached to an object, the stabilizing mount including a cylindrical element and a leveling system adjustably connected to the cylindrical element. The leveling system includes a sleeve adjustably connected to the cylindrical element, wherein the sleeve can be adjusted 360 degrees about the cylindrical element along a first axial direction and a first arm adjustably connected to the sleeve, wherein the first arm can be adjusted at least 180 degrees along a second axial direction that is substantially perpendicular to the first axial direction. The leveling system further includes a mount connector for removably attaching a device to the stabilizing mount.

An exemplary embodiment of the present invention also discloses a stabilizing mount including a clamp for removably attaching the stabilizing mount to an object, a cylindrical element connected to the clamp, and a leveling system adjustably connected to the cylindrical element. The leveling system includes a sleeve adjustably connected to the cylindrical element, wherein the sleeve can be adjusted 360 degrees about the cylindrical element along a first axial direction, a first arm adjustably connected to the sleeve, wherein the first arm can be adjusted at least 180 degrees along a second axial direction that is substantially perpendicular to the first axial direction, a second arm adjustably connected to the first arm, wherein the second arm can be adjusted 360 degrees about the first arm along the first axial direction, a third arm adjustably connected to the second arm, wherein the third arm can be adjusted 360 degrees about the second arm along the first axial direction, and a mount connector connected to the third arm, whereby a device can be removably attached to the stabilizing mount.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this specification, illustrate exemplary embodiments of the present invention, and together with the description serve to explain the principles of the present invention.

Figure 1:
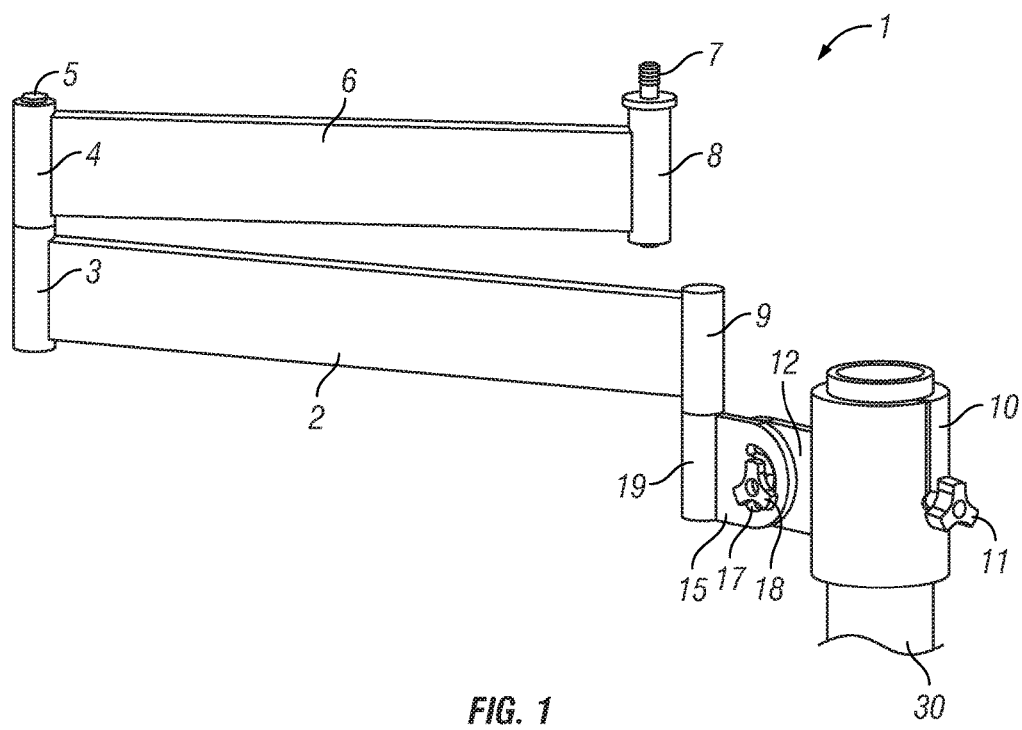
FIG. 1 is an isometric view of a stabilizing mount according to an exemplary embodiment of the present invention.
Figure 2:
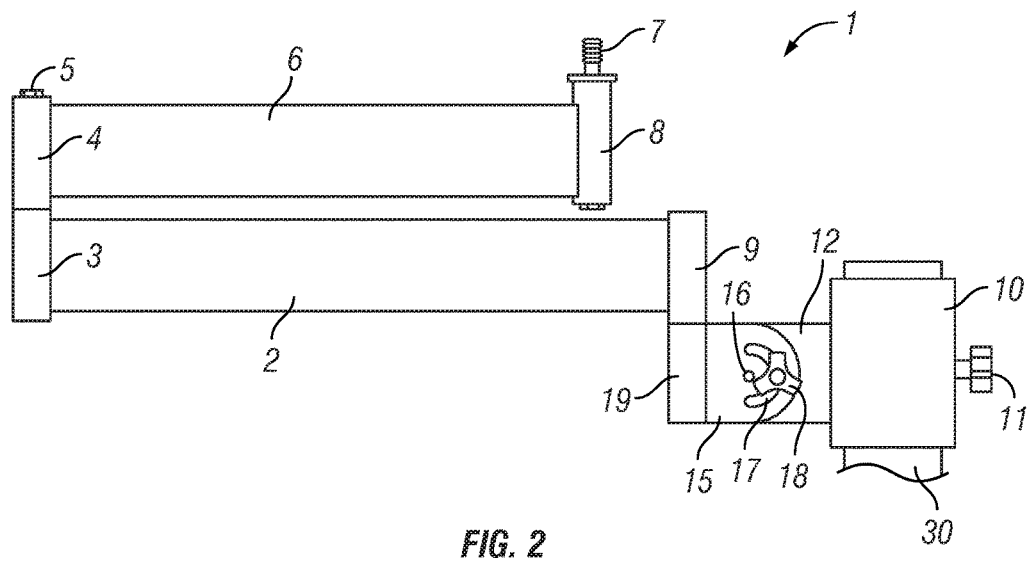
FIG. 2 is a side view of the stabilizing mount of FIG. 1.
Figure 3:
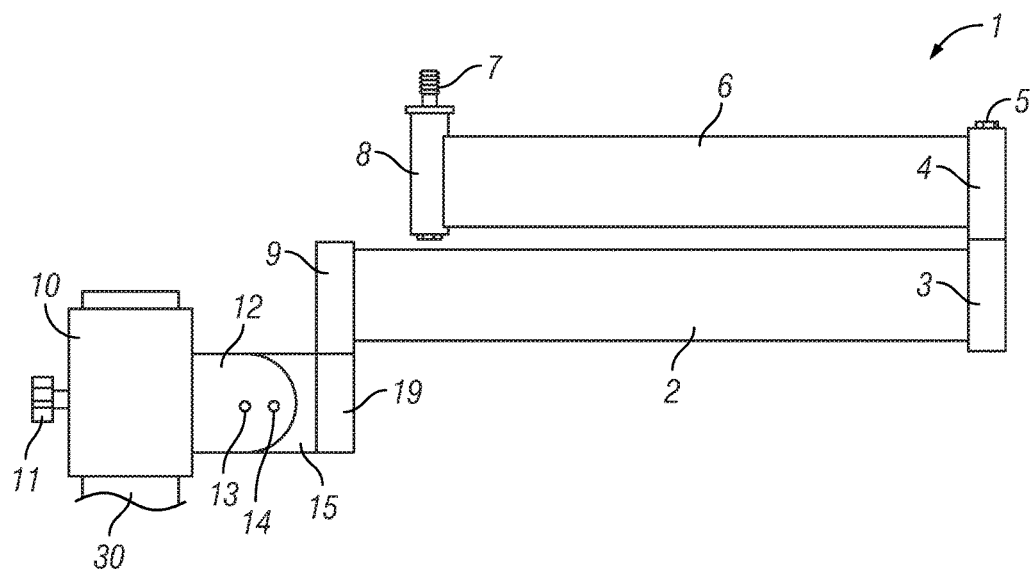
FIG. 3 is an opposite side view of the stabilizing mount of FIG. 1.
Figure 4:
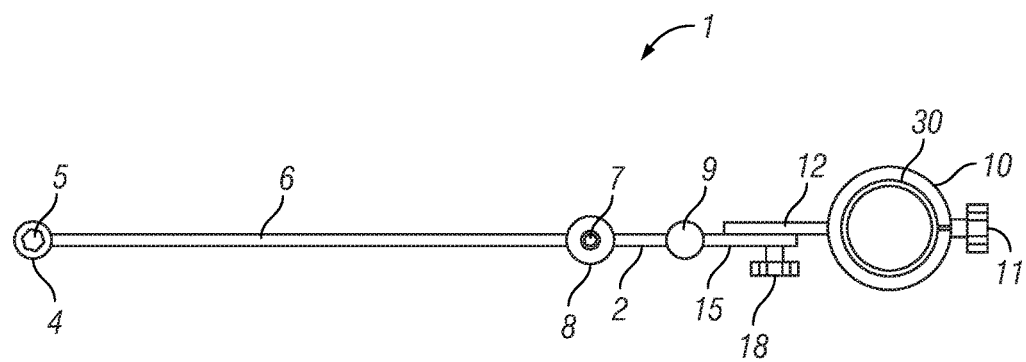
FIG. 4 is a top view of the stabilizing mount of FIG. 1.
Figure 5:
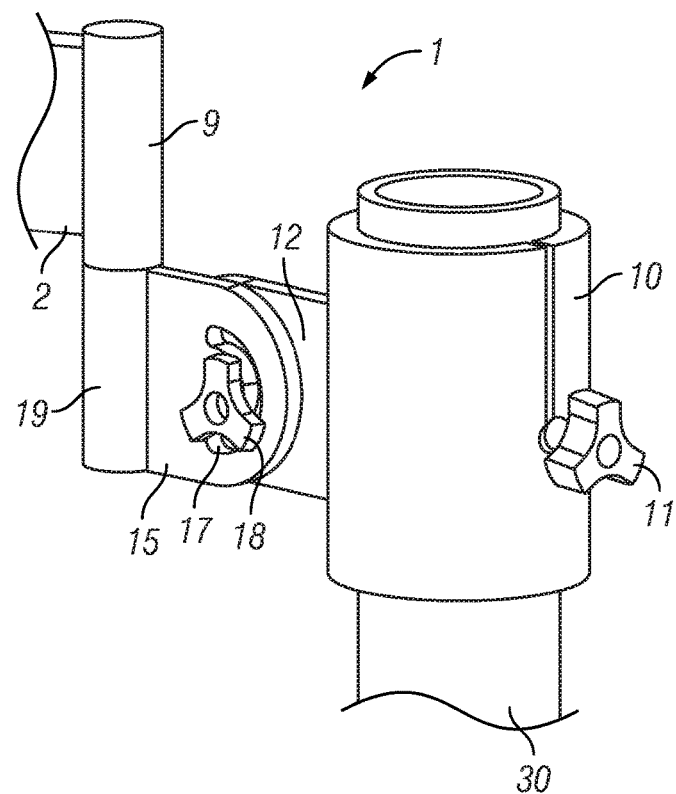
FIG. 5 is a partial isometric view of the stabilizing mount of FIG. 1.
Figure 6:
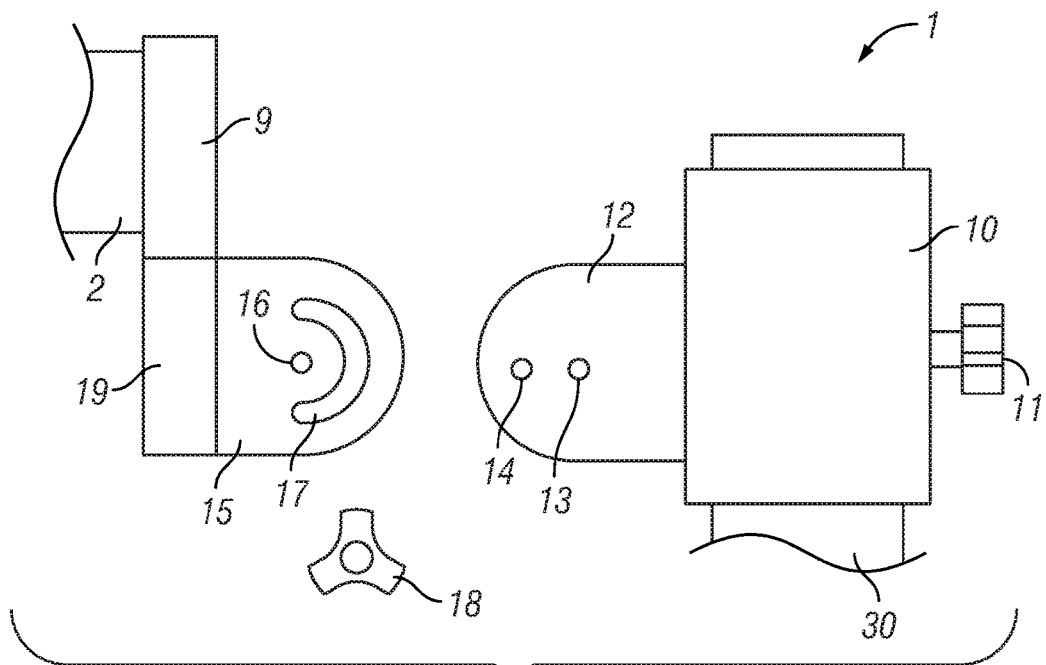
FIG. 6 is an exploded side view of the partial isometric view of the stabilizing mount of FIG. 5.
Figure 7:
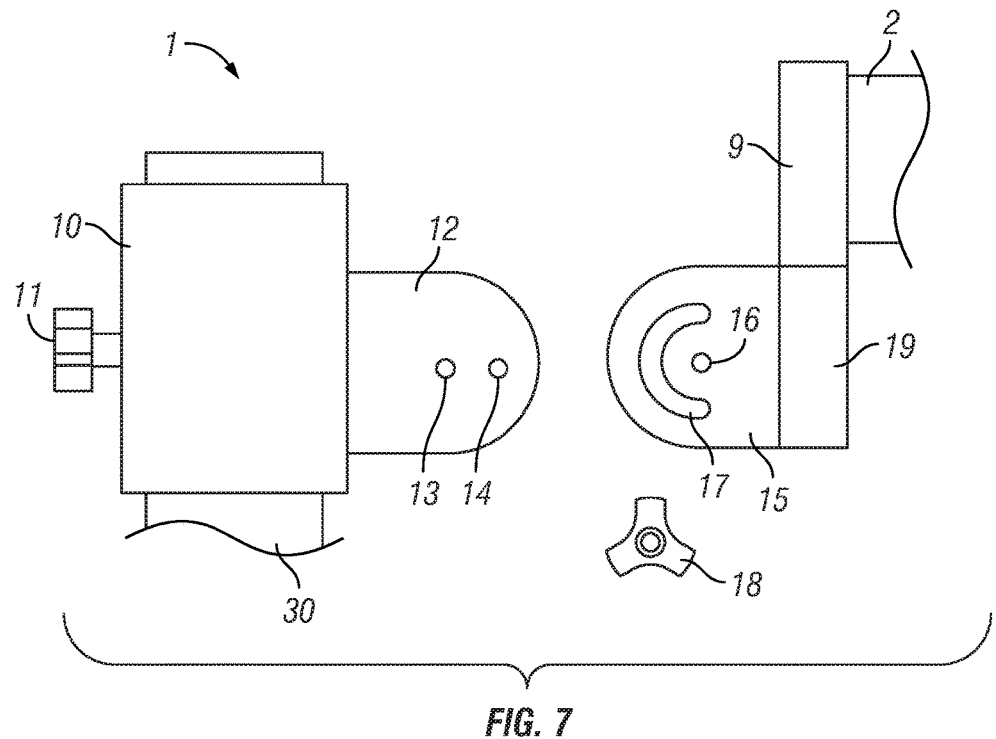
FIG. 7 is an exploded opposite side view of the partial isometric view of the stabilizing mount of FIG. 5.
Figure 8A:
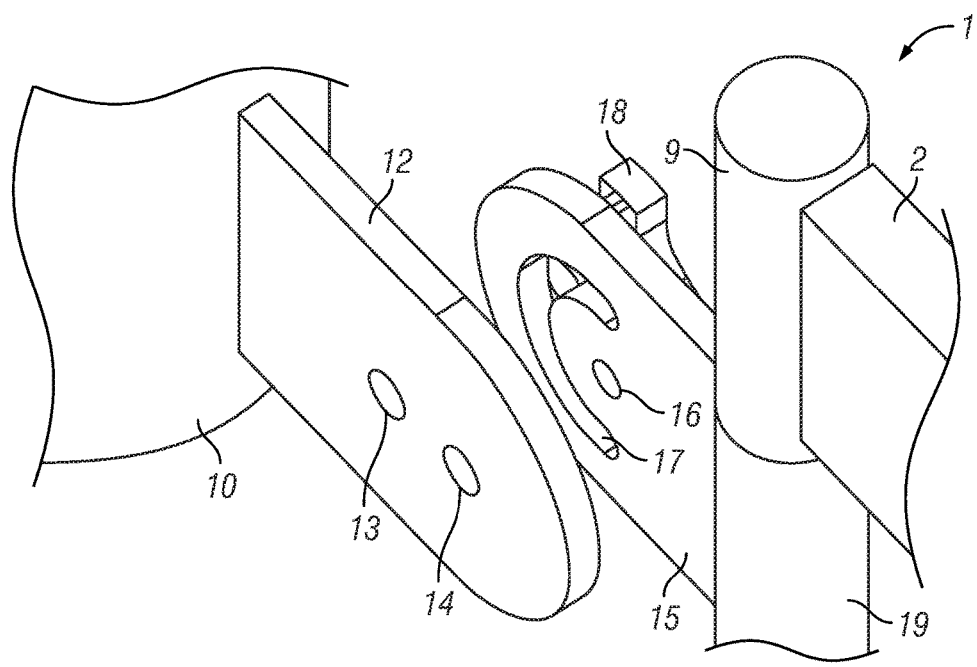
FIG. 8A and FIG. 8B are partial isometric views of the partial isometric view of the stabilizing mount of FIG. 5.
Figure 8B:
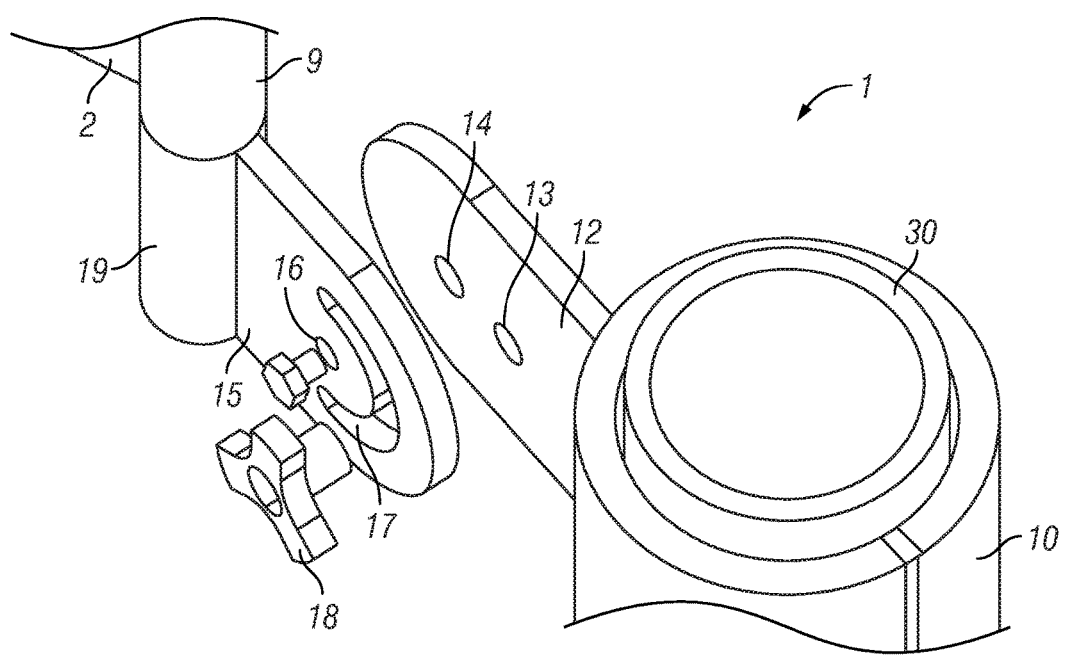

DETAILED DESCRIPTION OF THE
ILLUSTRATED EMBODIMENTS

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure is thorough, and will fully convey the scope of the present invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A stabilizing mount according to exemplary embodiments of the present invention includes a mount for a weapon or other device that may be connected to a surface regardless of whether the surface is vertical, horizontal, or any angle in between. The mount also has the ability to be leveled along a plane horizontal with the earth's surface so as to steady the weapon or device with respect to the horizon. According to an exemplary embodiment of the present invention as shown in FIG. 1, FIG. 2, FIG. 3, FIG. 4, FIG. 5, FIG. 6, FIG. 7, FIG. 8A, FIG. 8B, and FIG. 9, a stabilizing mount 100 includes a clamp 40, a cylindrical pipe 30 connected to and extending away from the clamp 40, and an articulating leveling system 1 connected to the pipe 30 via a sleeve 10. The stabilizing mount 100 may be made of any material having sufficient strength to mount and support the weight of a device such as a weapon made of metal. According to the present exemplary embodiment, the articulating leveling system 1 is made of aluminum, and the pipe 30 and the clamp 40 are made of steel.

According to the present exemplary embodiment, the pipe 30 extends away from the clamp 40. The clamp 40 will be described below in detail. The pipe 30 allows for the articulating leveling system 1 to have freedom of movement along the length of the pipe and also around the pipe. The articulating level system 1 includes a sleeve 10 that has substantially the same circumferential shape as the pipe 30, for example circular or cylindrical, as shown in FIG. 1, FIG. 2, FIG. 3, FIG. 4, FIG. 5, FIG. 6, FIG. 7, FIG. 8A, FIG. 8B, and FIG. 9. The sleeve 10 allows the articulating leveling system 1 to be placed over a portion of the external circumference of the pipe 30, and thus have 360-degree rotational freedom of movement. The sleeve 10 has a locking mechanism 11, such as a bolt or cam lever, that locks the sleeve 10 into a desired position on the pipe 30. As shown in FIG. 1, FIG. 2, FIG. 3, FIG. 4, FIG. 5, FIG. 6, FIG. 7, FIG. 8A, FIG. 8B, and FIG. 9, the locking mechanism 11 is a bolt having a knob on one end.

A first plate 12 is connected to the sleeve 10, the first plate 12 having a straight first end extending in a direction along the length of the pipe 30, so that the first end of the first plate 12 and the side of the sleeve 10 are substantially flush. The first plate 12 extends away from the pipe 30 in a direction substantially perpendicular to that of the length of the pipe. The first plate 12 has a curved second end opposite to the first end, and two holes 13 and 14 disposed parallel to each other along an imaginary line extending in a direction perpendicular to the length of the pipe 30. The curved second end of the first plate 12 has a semi-circular shape according to the present exemplary embodiment. A first hole 13 is disposed in the first plate 12 midway between the first and second ends of the first plate 12, and second hole 14 is disposed in the center of the semi-circular curved second end of the first plate 12.

A second plate 15 has a same general design and shape as the first plate 12, that is, having a straight first end and curved second end opposite to the first end. The first end of the second plate 15 is connected along the extending direction of a first pivot joint tube 19, as described in detail below. The second end of the second plate 15 has a semi-circular shape according to the present exemplary embodiment. A second hole 16 is disposed in the second plate 15 midway between the first and second ends of the second plate 15, and a first hole 17 is disposed in the second plate 15 between the second end of the second plate 15 and the second hole 16. According to the present exemplary embodiment, the first hole 17 is an arcuate slot that permits at least 180-degree rotation of the second plate 15 with respect to the first plate 12.

The first plate 12 and the second plate 15 are disposed substantially flush with each other, and are connected by a first connector (not shown) disposed between first holes 13 and 17, and a second connector (not shown) disposed between second holes 14 and 16. The first and second connectors may be bolts or studs. The first connector is unrestricted in its movement so that the first plate 12 and the second plate 15 can rotate freely around the axis created by the second holes 14 and 16. Further, a friction connector 18 is disposed on one end of the second connector so that the movement of the second plate 15 with respect to the first plate 12 may be restricted or stopped. The friction connector 18 may be a knob that is tightened against the side of the second plate 15. Alternatively, the friction connector 18 may be a cam lever, which may allow locking the position of the second plate 15 with respect to the first plate 12.

The articulating leveling system 1 includes a first pivot joint tube 19 connected to the second plate 15. A second pivot joint tube 9 is disposed on the first pivot joint tube 19, both the first pivot joint tube 19 and the second pivot joint tube 9 being connected by a freely rotating first pivot joint connector (not shown), such as a hinge or bolt. A first tube 2 is connected at a first end thereof to the second pivot joint tube 9. The first tube 2 pivots around a first pivot joint formed by the first pivot joint tube 19, the second pivot joint tube 9, and the first pivot joint connector. The first tube 2 has a greater length than height or width thereof, and may be substantially rectangular, as shown in FIG. 1, FIG. 2, FIG. 3, and FIG. 4. The first tube 2 also has a smaller height than the second pivot joint tube 9, in order to avoid hindering pivoting around the first pivot joint.

The first tube 2 may rotate 360 degrees around the first pivot joint if there are no obstacles preventing complete rotation. However, according to the present exemplary embodiment, the height of the sleeve 10 is greater than that of the first plate 12, second plate 15, and the first pivot joint 19, thus impeding the rotational movement of the first tube 2 around the pivot joint.

A third pivot joint tube 3 is connected to a second end of the first tube 2. A fourth pivot joint tube 4 is disposed on the third pivot joint tube 3, both the third pivot joint tube 3 and the fourth pivot joint tube 4 being connected by a freely rotating second pivot joint connector. According to the present exemplary embodiment the second pivot joint connector is a bolt 5, as shown in FIG. 1, FIG. 2, FIG. 3, and FIG. 4, but may also be a hinge. A second tube 6 is connected at a first end thereof to the fourth pivot joint tube 4. The second tube 6 pivots around a second pivot joint formed by the third pivot joint tube 3, the fourth pivot joint tube 4, and the second pivot joint connector (bolt 5). The second tube 6 has a greater length than height or width thereof, and may be substantially rectangular, as shown in FIG. 1, FIG. 2, FIG. 3, and FIG. 4.

According to the present exemplary embodiment, the second tube 6 also has a shorter length than that of the first tube 2, so as to allow unhindered 360-degree rotation of the second tube 6 around the second pivot joint. The second tube 6 also has a smaller height than the fourth pivot joint tube 4, in order to avoid hindering pivoting around the second pivot joint. The length of the second tube 6 may be made short enough to ensure 360-degree rotation around the second pivot joint, regardless of the location of the first tube 2 with respect to the sleeve 10 or the pipe 30. This way complete rotational freedom of the articulating leveling system 1 is possible. Thus, even if the first tube 2 is rotated around the first pivot joint so that it contacts the sleeve 10, the second tube 6 still has a 360-degree freedom of movement around the second pivot joint.

A mounting tube 8 is connected to a second end of the second tube 6. The mounting tube 8 has a mounting bolt 7 disposed therein, the mounting bolt 7 having an end that extends beyond an upper surface of the mounting tube 8. The mounting bolt 7 may have a threaded end, as shown in FIG. 1, FIG. 2, FIG. 3, FIG. 4, and FIG. 9, for attaching a threaded device thereto. The mounting tube 8 may also have a mounting surface, such as the flat horizontal surface shown in FIG. 1, FIG. 2, FIG. 3, FIG. 4, and FIG. 9, which has a greater diameter than the mounting tube 8 and helps stabilize a device mounted to the articulated leveling system 1.

Figure 9:
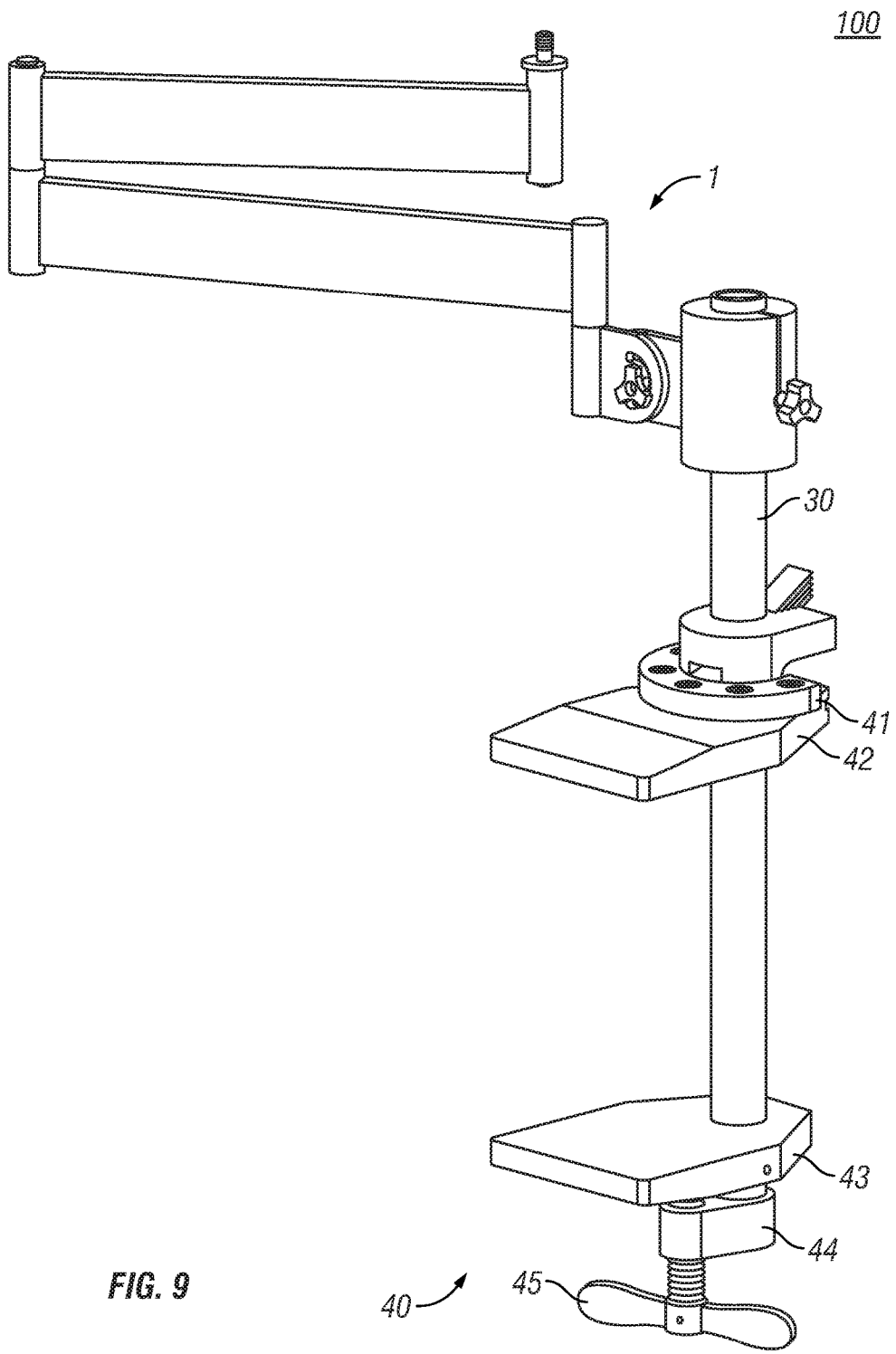
FIG. 9 is an isometric view of the stabilizing mount according to the present exemplary embodiment.
Figure 10:
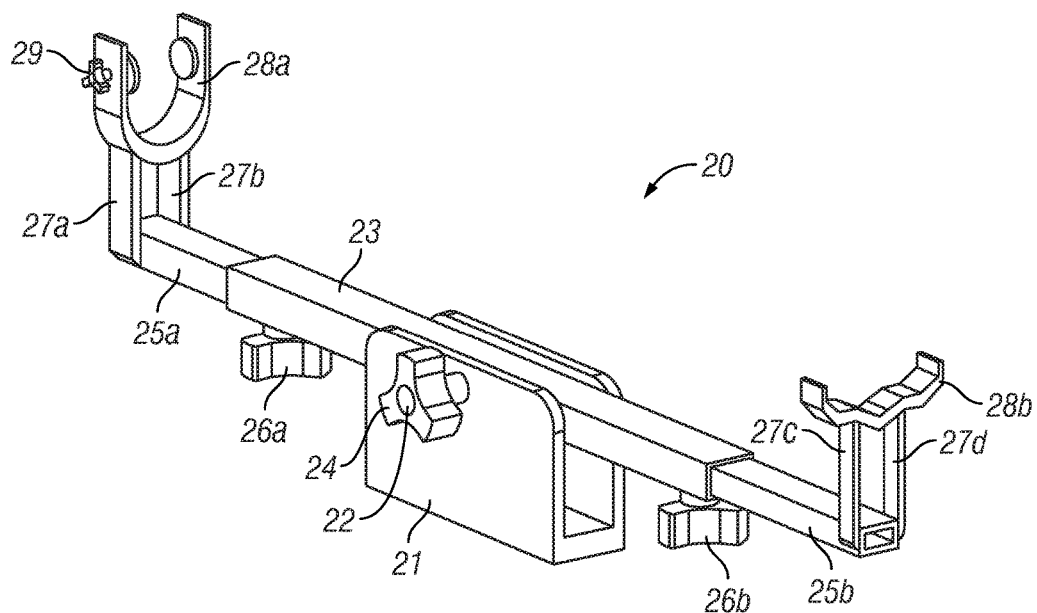
FIG. 10 is an isometric view of a device cradle according to an exemplary embodiment of the present invention.
Figure 11:
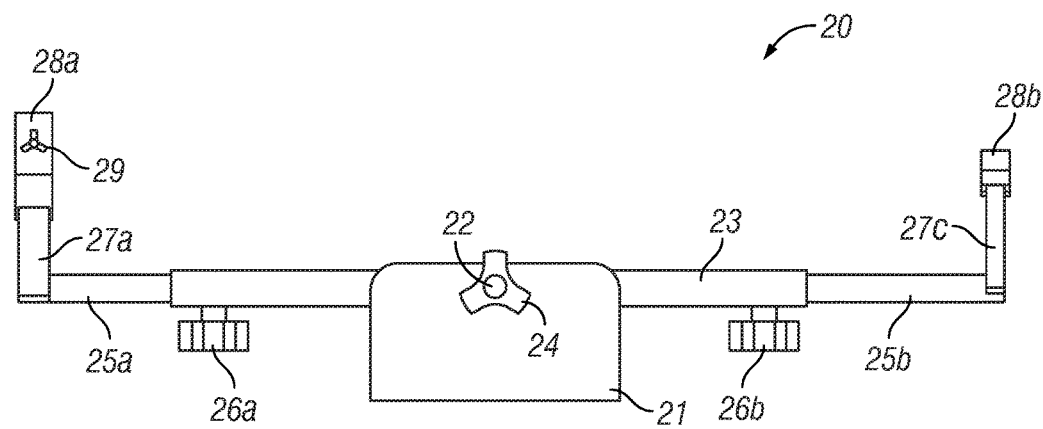
FIG. 11 is a side view of the device cradle of FIG. 10.
Figure 12:
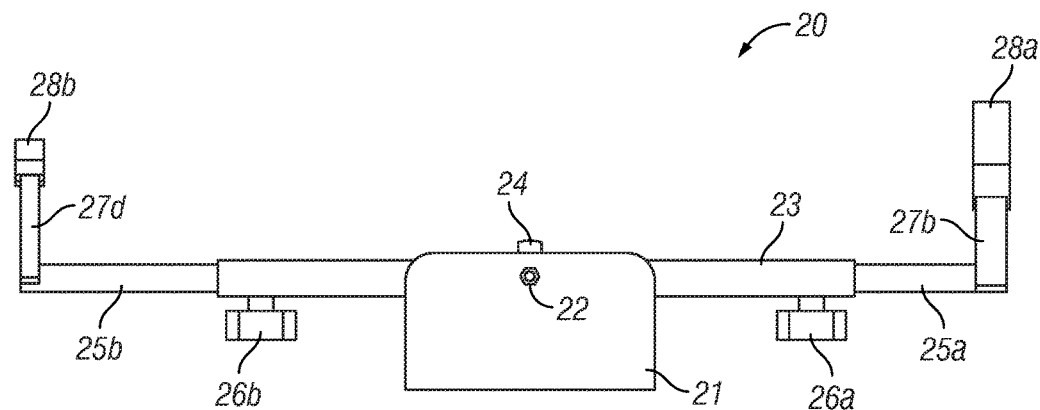
FIG. 12 is an opposite side view of the device cradle of FIG. 10.
Figure 13:
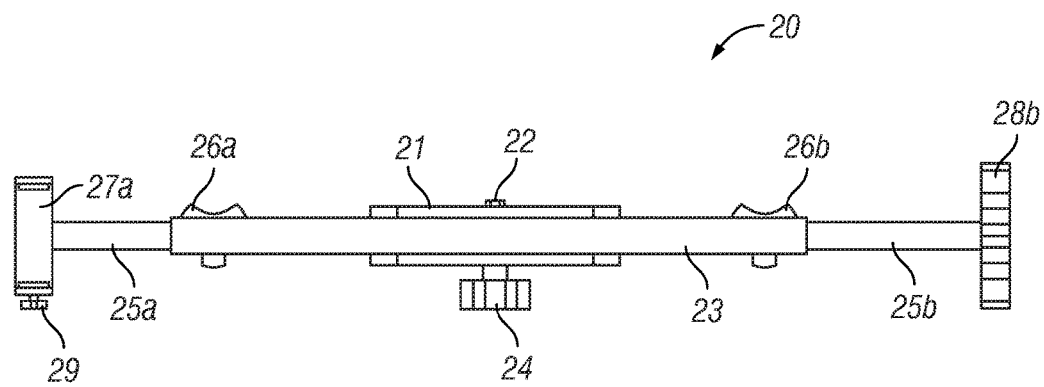
FIG. 13 is a top view of the device cradle of FIG. 10.

As shown in FIG. 9, the stabilizing mount 100 further includes a clamp 40 connected to the pipe 30. The clamp 40 includes a first clamp paddle 42 and a second clamp paddle 43, which may be symmetrical and respectively extend in a perpendicular direction from the extending direction of the pipe 30. A clamp paddle slide 41 is connected to the first clamp paddle 42 and is disposed between the articulated leveling system 1 and the first clamp paddle 42 along the pipe 30. The clamp paddle slide 41 is ordinarily in a "locked" position and secures the first clamp paddle 42 in place along the pipe 30, but may be adjusted by a user to move the first clamp paddle 42 along the pipe 30. The clamp paddle slide 41 may include a spring-actuated lever, as shown in the present exemplary embodiment, and when depressed by a user may be put in an "unlocked" position, allowing movement of the clamp paddle slide 41 and the first clamp paddle 42.

The second clamp paddle 43 is disposed at an end of the pipe 30, and is connected to a screw 45, which is threaded through a securing piece 44. Thus, the second clamp paddle 43 may be adjusted along the length of the pipe 30 by turning the screw 45. The securing piece 44 is connected to the end of the pipe 30, and prevents movement of the second clamp paddle 43 and the screw 45 along the pipe 30 when the screw 45 and the second clamp paddle 43 are not being adjusted by a user.

A user may utilize the clamp 40 to secure the stabilizing mount 100 to various surfaces, by unlocking the clamp paddle slide 41 and moving the first clamp paddle 42 along the pipe 30 to a desired position. The first clamp paddle 42 is thus secured on one side of an intended surface, and the second clamp paddle 43 is secured on the opposite side of the intended surface. The pipe 30 may be any length as needed by a user to secure the clamp 40 to various surfaces, and without causing physical interference between the clamp 40 and the articulated leveling system 1. For example, the pipe 30 may be of sufficient length so that the clamp 40 can be secured to the entire width of a cinder block. Likewise, the first and second clamp paddles 42 and 43 may each be of sufficient length and width so as to allow the clamp 40 to secure the stabilizing mount 100 to various surfaces as needed by a user.

The clamp 40 allows a user to secure the stabilizing mount 100 to various surfaces, regardless of the inclination angle of the surface. Since the articulated leveling system 1 may be rotated 360-degrees around the pipe 30, and the pitch of the articulated leveling system 1 may be adjusted by at least 180 degrees, the stabilizing mount 100, and a device attached thereto, may be made level along a plane horizontal with the earth's surface or parallel with the horizon. The articulated leveling system 1 may be inverted on the pipe 30 in order to allow the stabilizing mount 100 to be made level along a plane horizontal with the earth's surface or parallel with the horizon, depending on the inclination angle of the pipe 30 after the clamp 40 is secured to a surface.

According to an exemplary embodiment of the present invention, the clamp 40 may be used to create a fourth pivot joint for the stabilizing mount 100. Specifically, when the sleeve 10 of the articulated leveling system 1 is disposed on the clamp paddle slide 41, and the locking mechanism 11 is not locked, then the sleeve 10 may rotate freely 360 degrees around the pipe 30. The fourth pivot point may be useful for increasing the length by which the articulated leveling system 1 permits the attached device to extend in a straight line while being pointed at a target. Specifically, if a user wants to push the device forward or pull the device backward along a straight line while continuously aimed at a target, the distance by which a user may do so is increased when employing the fourth pivot joint, compared to utilizing the articulated leveling system 1 having only three pivot joints.

FIG. 10, FIG. 11, FIG. 12, FIG. 13, and FIG. 14 shows a device cradle 20 according an exemplary embodiment of the present invention. The device cradle 20 may be part of the stabilizing mount 100 as described above, or the stabilizing mount 200 as described below. Although not shown, the device cradle 20 may be mounted to the mounting bolt 7 of the articulating leveling system 1 as described above, or mounted to the mounting bolt 207 of the articulating leveling system 201 as described below.

The device cradle 20 includes a cradle housing 21 having a bottom and first and second side walls that are parallel to each other and with a space between them. The cradle housing 21 may be substantially rectangular. The bottom of the cradle housing 21 has a hole (not shown) for mounting on the mounting bolt 7 of the articulating leveling system 1. The cradle housing 21 mounted on the mounting bolt 7 is disposed on the mounting tube 8, so the cradle housing 21 may rotate around the mounting tube 8.

A cradle body 23 is disposed in the cradle housing 21 between the first and second side walls. The cradle body 23 has a hole formed in the sides thereof. A hole is formed in each of the first and second side walls of the cradle housing 21, and a connector 22 is disposed through the holes in the first and second side walls of the cradle housing 21 and the hole in the cradle body 23. The connector 22 may be a bolt or other connector that permits free rotation around it. Accordingly, the cradle body 23 may be pivoted around the connector 22 inside of the cradle housing 21. A knob 24 may be disposed on one end of the connector 22, the knob 24 securing the cradle body 23 in place in the cradle housing 21 by tightening, and thus prevent movement of the cradle body 23.

The cradle body 23 may be a hollow tube or be partially hollow in ends thereof. Cradle arms 25a and 25b each having a diameter less than that of the cradle body 23 are inserted in opposite ends of the cradle body 23, and so the cradle arms 25a and 25b may telescope into and out of the cradle body 23. Connectors 26a and 26b are disposed in holes formed in bottom surfaces of the cradle body 23, which may be tightened against the cradle arms 25a and 25b, respectively, so as to secure the cradle arms 25a and 25b with respect to the cradle body 23. As shown in FIG. 10, FIG. 11, FIG. 12, FIG. 13, and FIG. 14, the connectors 26a and 26b may each be a bolt having a knob end.

Figure 14:
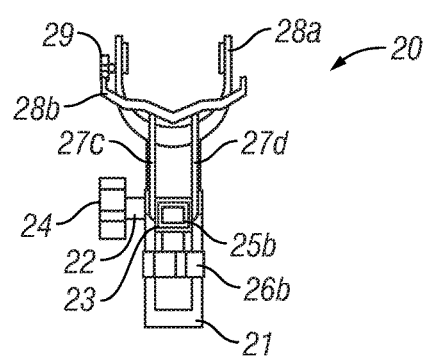
FIG. 14 is a front view of the device cradle of FIG. 10.
Figure 15:
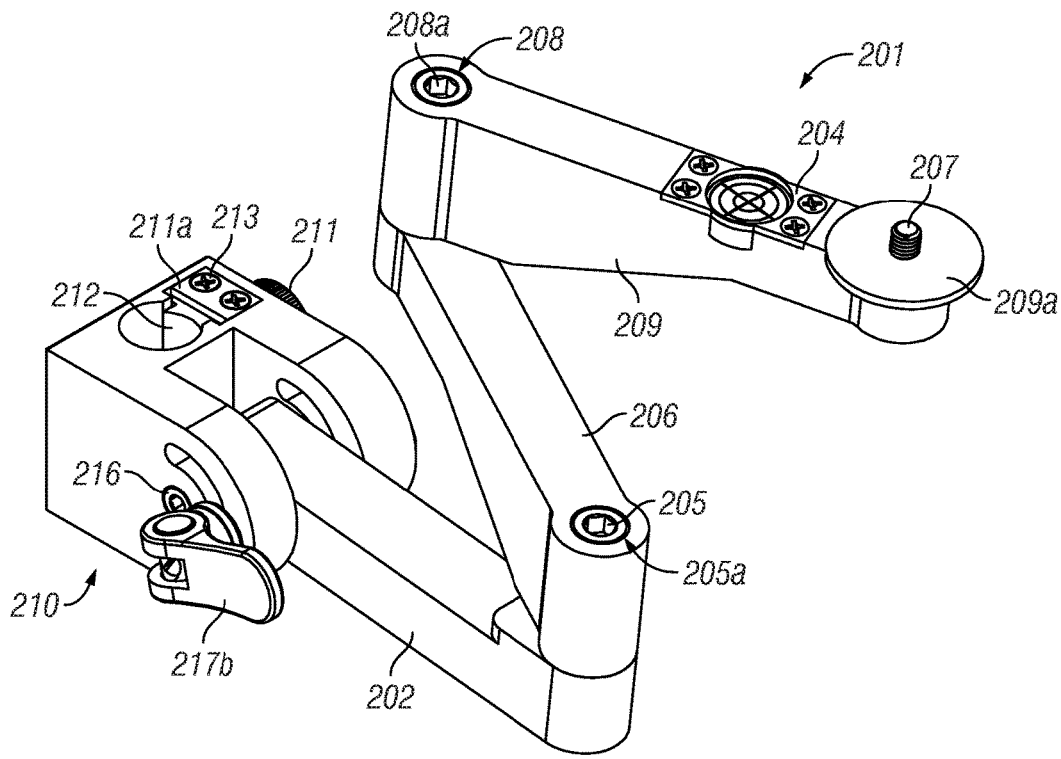
FIG. 15 is an isometric view of a stabilizing mount according to an exemplary embodiment of the present invention.

Vertical plates 27a and 27b are connected to the cradle arm 25a, and vertical plates 27c and 27 are connected to the cradle arm 25b, as shown in FIG. 10, FIG. 11, FIG. 12, FIG. 13, and FIG. 14. As shown in FIG. 14, vertical plates 27a and 27b extend parallel to each other on opposite sides of the end of cradle arm 25a, while vertical plates 27c and 27d extend parallel to each other on opposite sides of the end of cradle arm 25b. Cradle 28a is disposed on the vertical plates 27a and 27b, and cradle 28b is disposed on the vertical plates 27c and 27d. Each of the cradles 28a and 28b has a bottom and sides, with an open top, so that a device (not shown) can be placed in each cradle 28a and 28b and be supported and stabilized by the device cradle 20. According to the present exemplary embodiment, the cradle 28a has a hole in one side surface, with a connector 29 disposed therein. The connector may be a bolt with a knob at the end thereof, so that a device placed in the cradle 28a may be held in place by tightening the connector 29.

Thus, a device placed in the device cradle 20 may extend parallel to the extending direction of the cradle body 23 and the cradle arms 25a and 25b. Accordingly, a device can be balanced and stabilized within the device cradle 20 since the cradles 28a and 28b are disposed on either side of the cradle body 23, the connector 22 acting as a balance point for the device cradle 20. The pitch of the cradle body 23 and the length of the cradle arms 25a and 25b can be adjusted by a user in order to further balance and stabilize the device.

According to an exemplary embodiment of the present invention as shown in FIG. 15, FIG. 16, FIG. 17, FIG. 18, FIG. 19, FIG. 20, FIG. 21, FIG. 22, FIG. 23, FIG. 24, FIG. 25, and FIG. 26, a stabilizing mount 200 includes a clamp 240, a cylindrical pipe 230 connected to and extending away from the clamp 240, and an articulating leveling system 201 connected to the pipe 230 via a sleeve 210. The stabilizing mount 200 according to the present exemplary embodiment may be substantially similar in various respects to the stabilizing mount 100 as described above with respect to FIG. 1, FIG. 2, FIG. 3, FIG. 4, FIG. 5, FIG. 6, FIG. 7, FIG. 8A, FIG. 8B, and FIG. 9 of the present application, and the disclosure thereof is incorporated herein by reference, and any repeated disclosure may be omitted for the sake of brevity. Likewise, the disclosure with respect to the stabilizing mount 200 described in connection with FIG. 15, FIG. 16, FIG. 17, FIG. 18, FIG. 19, FIG. 20, FIG. 21, FIG. 22, FIG. 23, FIG. 24, FIG. 25, and FIG. 26 is incorporated by reference into the exemplary embodiment described with respect to FIG. 1, FIG. 2, FIG. 3, FIG. 4, FIG. 5, FIG. 6, FIG. 7, FIG. 8A, FIG. 8B, and FIG. 9 above.

The sleeve 210 allows the articulating leveling system 201 to be placed over a portion of the external circumference of the pipe 230. The sleeve 210 has a locking mechanism 211 that locks the sleeve 210 into a desired position on the pipe 230. As shown in FIG. 16, FIG. 17, FIG. 18, FIG. 20, and FIG. 26, the locking mechanism 211 includes a bolt having a knob on one end. As shown in detail in FIG. 20, a counter-sunk portion is formed in the sleeve 210. The locking mechanism 211 knob is disposed in the counter-sunk portion of the sleeve 210, which reduces the length of the locking mechanism 211 protruding from the side of the sleeve 210. The locking mechanism 211 further includes a locking block 211a, which is disposed in an interior portion of the sleeve 210, in an area adjacent to the hole in the sleeve 210 for accommodating the pipe 230. When the locking mechanism 211 is tightened, the locking block 211a is moved towards the hole. A pad 212 is disposed between the locking block 211a and the hole, the pad 212 being shaped to generally conform to the shape of the pipe 230. The pad 212 is held in place on the locking block 211a by connectors 213.

Accordingly, when the locking mechanism 211 is tightened, the locking block 211a pushes the pad 212 against the pipe 230, preventing the sleeve 210 and the articulating leveling system 201 from moving with respect to the pipe 230. The locking block 211a and the pad 212 extend for substantially the entire height of the sleeve 210, and thus the tightening force of the locking mechanism 211 is evenly distributed against the pipe 230 along substantially the entire height of the sleeve 210.

As shown in FIG. 15, FIG. 18, FIG. 21, FIG. 22, FIG. 23, FIG. 24, FIG. 25, and FIG. 26, the sleeve 210 of the articulating leveling system 201 has a roughly "C" shape in an overhead view. A first end of the sleeve 210 is continuous along the width of the sleeve 210, and the continuous portion of the sleeve 210 encompasses the locking block 211a, the pad 212 and the hole for accommodating the pipe 230, as described above. Extending along the length of the sleeve 210 towards a second end opposite to the first end, the sleeve 210 is divided into first arm 210a and second arm 210b. A space is formed between the first and second arms 210a and 210b along the width direction of the sleeve 210. The hole in the sleeve 210 to accommodate the pipe 230 is aligned with the space between the first and second arms 210a and 210b along the length direction of the sleeve 210. As will be described in detail below, the space between the first and second arms 210a and 210b is formed to accommodate a first tube 202.

As shown in FIG. 15, FIG. 16, FIG. 17, FIG. 18, FIG. 19, FIG. 20, FIG. 24, FIG. 25, and FIG. 26, holes are formed in side surfaces of the sleeve 210 of the articulating leveling system 201. In particular, a first hole 214a and a second hole 215a are formed through the side of the first arm 210a. A third hole 214b and a fourth hole 215b are formed through the side of the second arm 210b. The first hole 214a and third hole 214b are respectively disposed midway between the second end of the sleeve 210 and the continuous portion of the sleeve 210. That is, the first hole 214a and third hole 214b are disposed in the middle of the space between the first and second arms 210a and 210b, along the length direction of the sleeve 210, and along an imaginary line substantially perpendicular to the extending direction of the pipe 230. The second hole 215a and the fourth hole 215b are disposed between the second end of the sleeve 210 and the first hole 214a and third hole 214b, respectively. The second hole 215a and the fourth hole 215b may each be an arcuate slot or other type of continuous opening the permits at least 180-degree movement therein. The ends of the first and second arms 210a and 210b, corresponding to the second end of the sleeve 210, may be curved, so as to correspond to the curved second and fourth holes 215a and 215b.

A portion of the first tube 202 is disposed in the space between the first and second arms 210a and 210b of the sleeve 210. This arrangement of the first tube 202 and first and second arms 210a and 210b of the sleeve 210 improves stability of the articulating leveling system 201, in particular lateral stability of the first tube 202. Two holes (not shown) are formed though the side of the first tube 202, and a first connector 216 and a second connector 217 are disposed therethrough, respectively. The first connector 216 extends through the first hole 214a, the first tube 202, and the third hole 214c. The second connector 217 extends through the second hole 215b, the first tube 202, and the fourth hole 215d. Thus, the two holes in the first tube 202 are aligned with the holes 214a, 215a, 214b, and 215b of the first and second arms 210a and 210b of the sleeve 210. The first connector 216 allows the first tube 202 to pivot within the sleeve 210. The first connector 216 is unrestricted in its movement so that the first tube 202 can rotate freely around the axis created by the first hole 214a and the third hole 214b.

Figure 17:
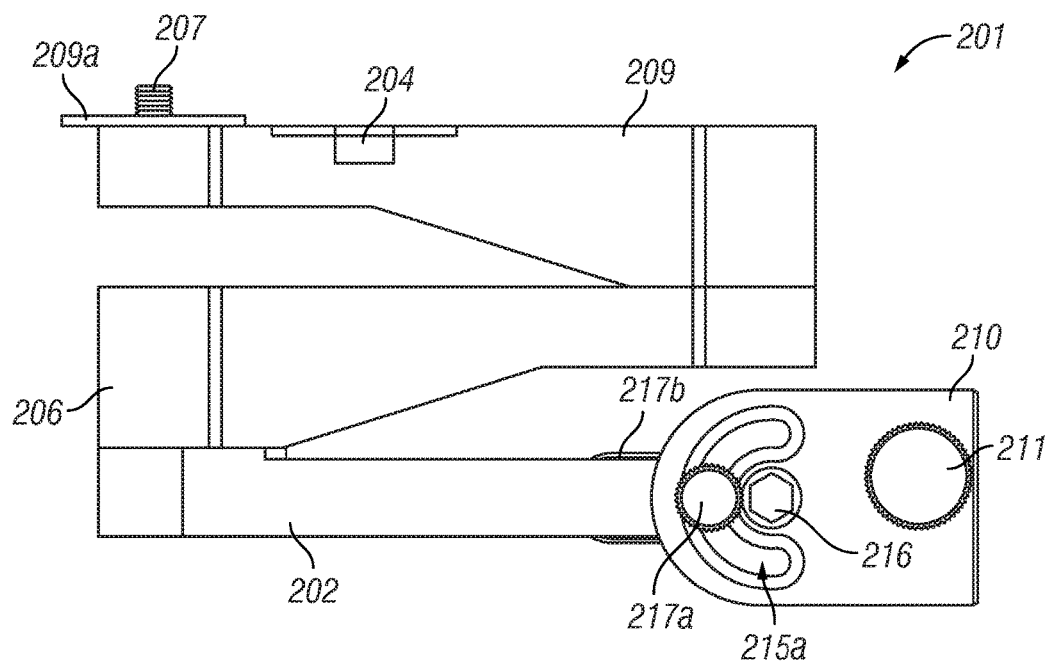
FIG. 17 is an opposite side view of the stabilizing mount of FIG. 15.
Figure 18:
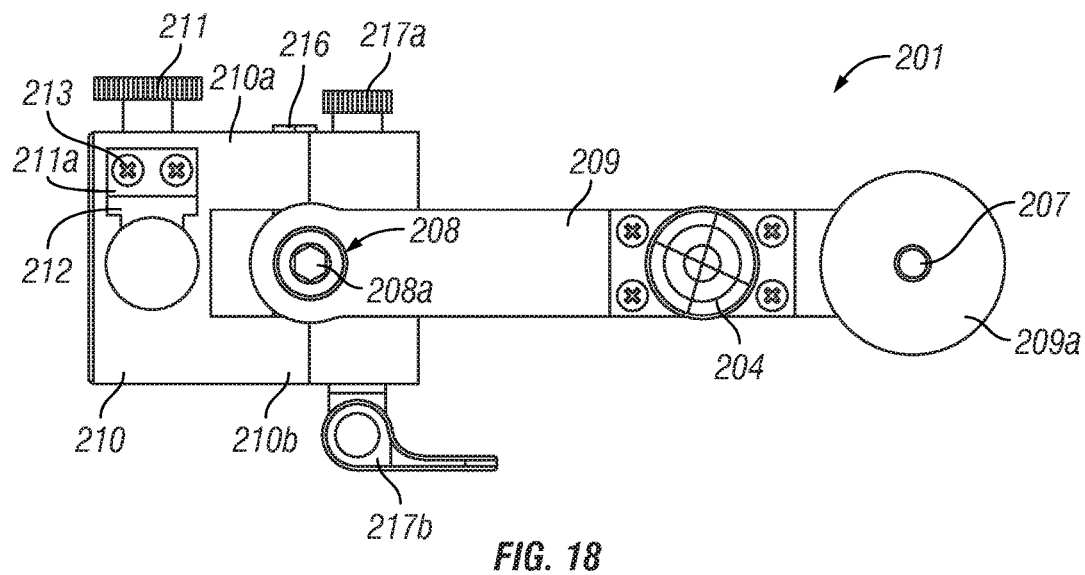
FIG. 18 is a top view of the stabilizing mount of FIG. 15.
Figure 19:
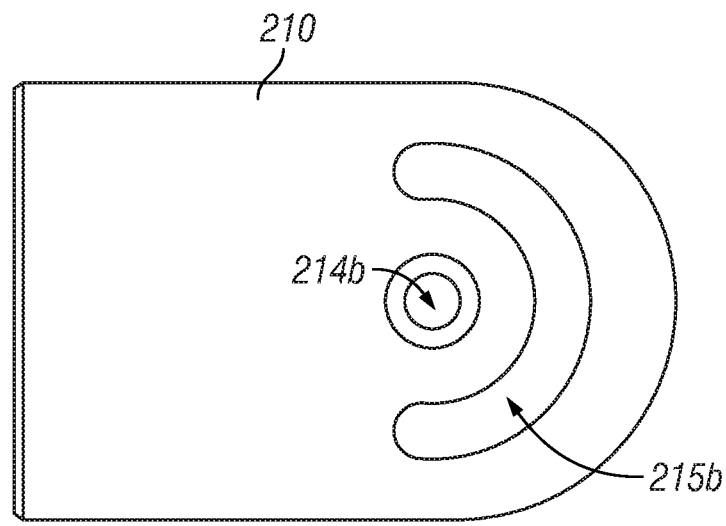
FIG. 19 is a side view of a sleeve element of the stabilizing mount of FIG. 15.
Figure 20:
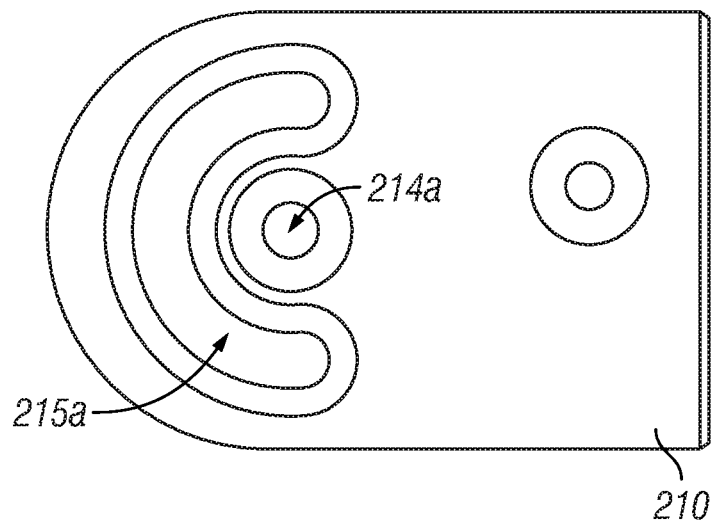
FIG. 20 is an opposite side view of the sleeve element of FIG. 19.
Figure 21:
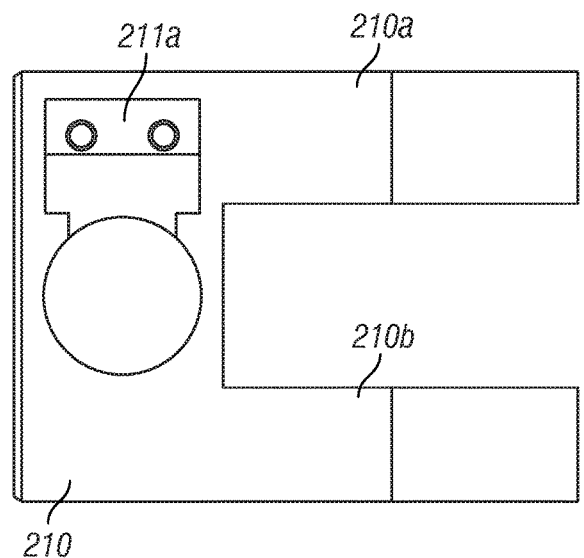
FIG. 21 is a top view of the sleeve element of FIG. 19.
Figure 22:
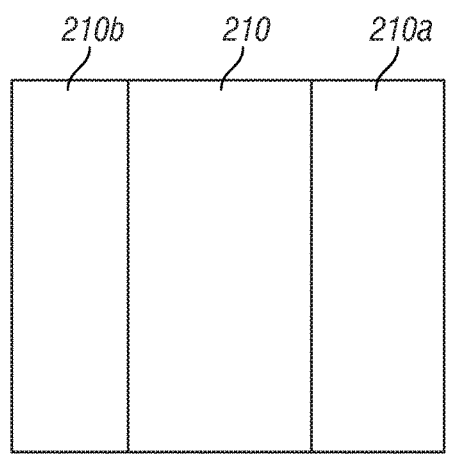
FIG. 22 is a front view of the sleeve element of FIG. 19.
Figure 23:
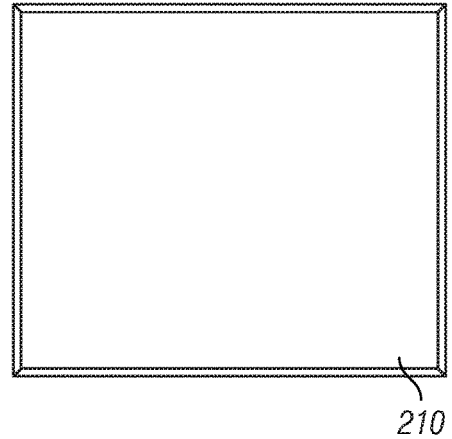
FIG. 23 is a rear view of the sleeve element of FIG. 19.
Figure 24:
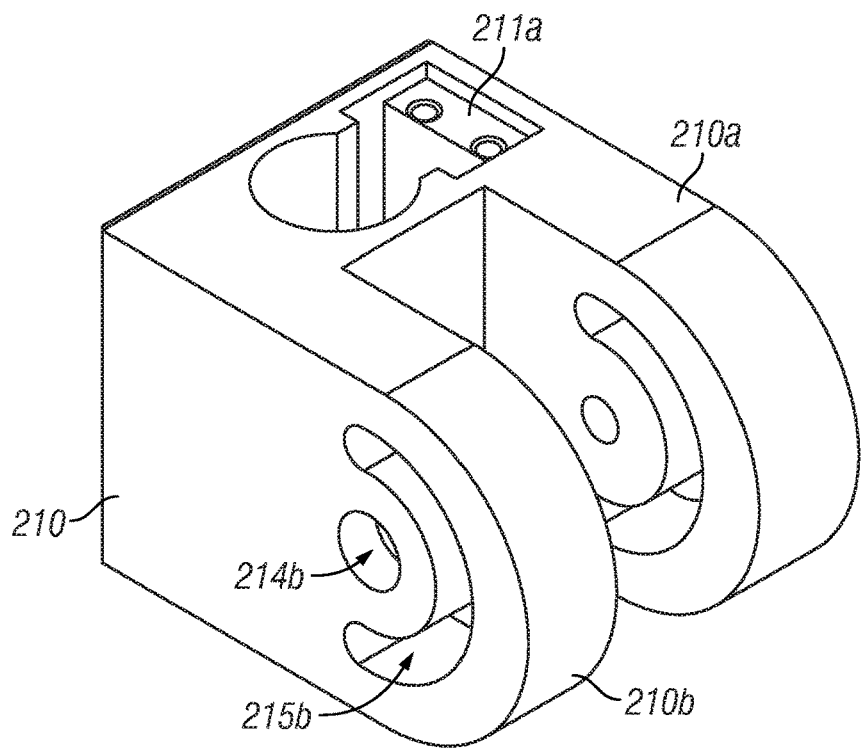
FIG. 24 is a front isometric view of the sleeve element of FIG. 19.
Figure 25:
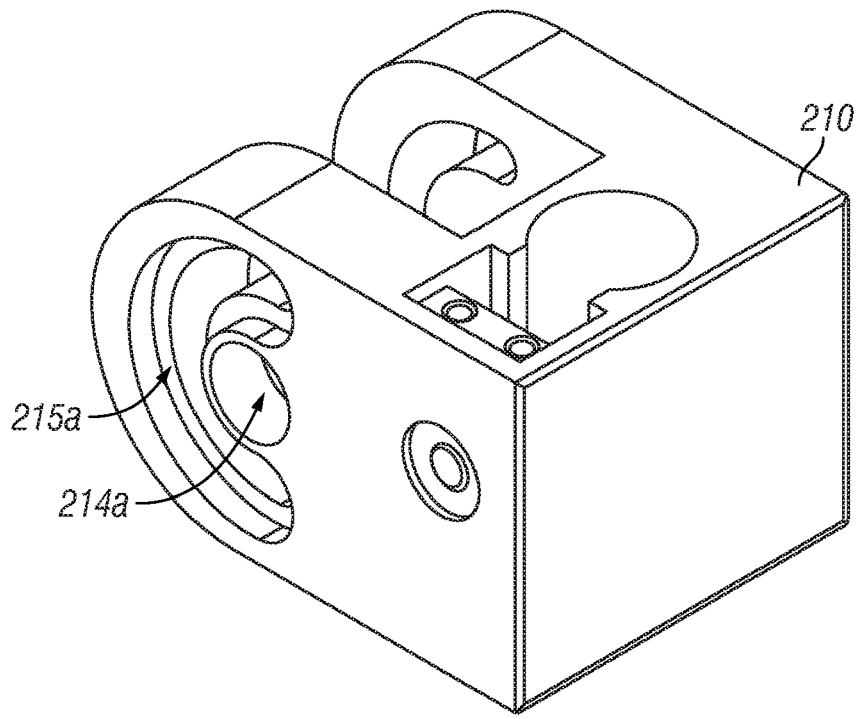
FIG. 25 is a rear isometric view of the sleeve element of FIG. 19.

According to the present exemplary embodiment, as shown in detail in FIG. 19 and FIG. 20, the first hole 214a is within a counter-sunk portion in the sleeve 210. Thus, the connector 216 is disposed in the counter-sunk portion of the sleeve 210. The first end of the connector 216 may be a bolt, as shown in FIG. 17, and thus the bolt may be disposed substantially in the counter-sunk portion of the sleeve 210, as shown in FIG. 18. Likewise, the third hole 214b is within a counter-sunk portion in the sleeve 210. The second end of the connector 216 may have a nut disposed thereon, and the nut may be disposed substantially in the counter-sunk portion of the sleeve 210, as shown in FIG. 18. Thus, the bolt and the nut are substantially prevented from protruding from the sides of the sleeve 210.

The second connector 217 is disposed in the second and fourth holes 215a and 215b and the corresponding hole in the first tube 202. The second connector 217 can move continuously within the second and fourth holes 215a and 215b, and the first tube 202 may rotate at least 180 degrees with respect to the sleeve 210, pivoting around the first connector 216. Thus, the first tube 202 can rotate at least 90 degrees above and 90 degrees below the imaginary line substantially perpendicular to the extending direction of the pipe 230, so the first tube 202 may be substantially parallel to the pipe 230 when rotated in the sleeve 210.

According to the present exemplary embodiment, as shown in FIG. 15, FIG. 16, FIG. 17, and FIG. 18, a friction connector 217a is disposed on a first end of the second connector 217 so that the movement of the first tube 202 with respect to the sleeve 210 may be restricted or stopped. The friction connector 217a may be a knob that is tightened against the side of the first tube 202. Specifically, as shown in detail in FIG. 20, the second hole 215a is within a counter-sunk portion in the sleeve 210. Thus, the friction connector 217a is disposed on the counter-sunk portion of the sleeve 210, and the length of the friction connector 217a protruding from the side of the sleeve 210 is reduced.

Further, a cam lever 217b is disposed on a second end of the second connector 217, according to the present exemplary embodiment as shown in FIG. 15, FIG. 16, FIG. 17, and FIG. 18. The cam lever 217b allows locking the position of the first tube 202 with respect to the sleeve 210. As will be described in detail below, the articulating leveling system 201 may be leveled along a plane horizontal with the earth's surface or parallel with the horizon by adjusting the pitch of the first tube 202 in the sleeve 210, then locked in place using the cam lever 217b.

Figure 16:
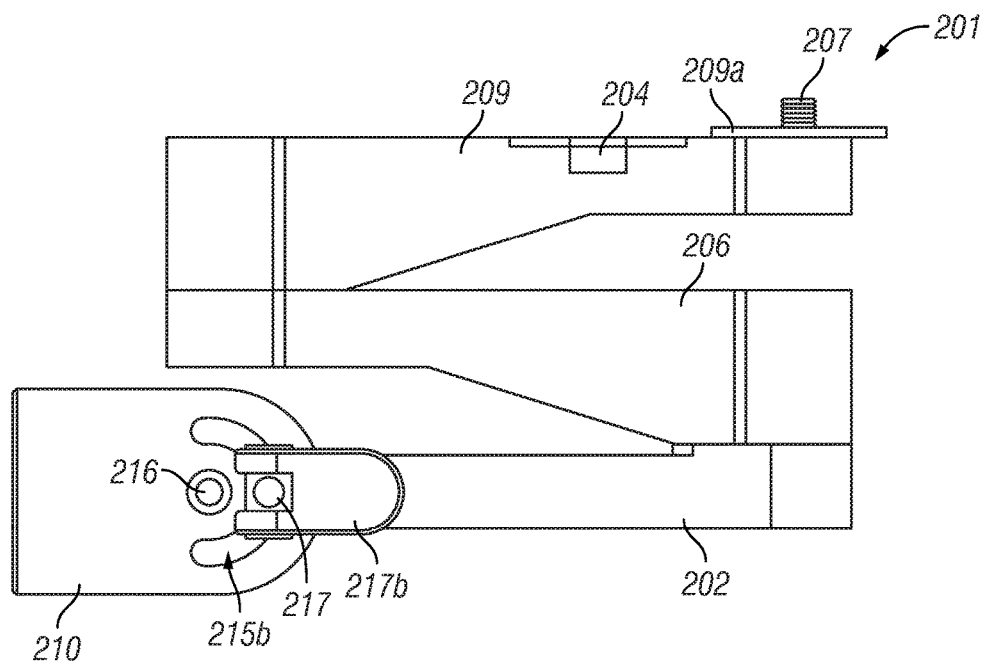
FIG. 16 is a side view of the stabilizing mount of FIG. 15.

The articulating leveling system 201 includes a first pivot joint 205. A hole (not shown) is formed through the second end of the first tube 202. A first end of a second tube 206 having a hole therethrough is disposed on the second end of the first tube 202, so that the holes overlap. A freely rotating pivot joint connector 205a, such as a bolt, is disposed in the overlapping holes of the first tube 202 and the second tube 206, to form the first pivot joint 205. The second tube 206 pivots around the first pivot joint 205. The second tube 206 may rotate 360 degrees around the first pivot joint 205 if there are no obstacles preventing complete rotation. The second tube 206 may have a length equal to the length of the first tube 202, as shown in FIG. 16, FIG. 17, and FIG. 18.

The articulating leveling system 201 also includes a second pivot joint 208. A third tube 209 is connected to a second end of the second tube 206. A hole (not shown) is formed through the second end of the second tube 206. A first end of the third tube 209 having a hole therethrough is disposed on the second end of the second tube 206, so that the holes overlap. A freely rotating pivot joint connector 208a, such as a bolt, is disposed in the overlapping holes of the second tube 206 and the third tube 209, to form the second pivot joint 208. The third tube 209 pivots around the second pivot joint 208. The third tube 206 may rotate 360 degrees around the second pivot joint 208 if there are no obstacles preventing complete rotation. The third tube 209 may have a length equal to the length of the first tube 202 and the second tube 206, as shown in FIG. 16, FIG. 17, and FIG. 18.

A mounting bolt 207 is disposed in the third tube 209, the mounting bolt 207 having an end that extends beyond an upper surface of the third tube 209. The mounting bolt 207 may have a threaded end, as shown in FIG. 15, FIG. 16, FIG. 17, and FIG. 18, for attaching a threaded device (not shown) thereto. According to the present exemplary embodiment, the threaded device attached to the mounting bolt 207 has the ability to rotate 360 degrees, without becoming disconnected from the mounting bolt 207. The threaded device may permit mounting another device thereon. Alternatively, the mounting bolt 207 itself may freely rotate 360 degrees in the third tube 209. Thus, the mounting bolt 207 is considered a third pivot joint. The third tube 209 may also have a mounting surface 209a, such as the flat horizontal surface shown in FIG. 15, FIG. 16, FIG. 17, and FIG. 18, which has a greater diameter or width than the third tube 209, and helps stabilize a device mounted to the mounting bolt 207 and the articulated leveling system 201.

A level 204 is disposed in the third tube 209, as shown in FIG. 15, FIG. 16, FIG. 17, and FIG. 18. Accordingly, a user of the stabilizing mount 200 can easily level the articulating leveling system 201 along a plane horizontal with the earth's surface or parallel with the horizon, by adjusting the pitch thereof with respect to the sleeve 210. For example, if the sleeve 210 is not level along a plane horizontal with the earth's surface (such as if the pipe 230 is at an angle other than 90 degrees), the horizontal direction of the articulating leveling system 201 as shown in FIG. 15, FIG. 16, FIG. 17, and FIG. 18 may not be level with the horizon. Therefore, a user can change the pitch of the articulating leveling system 201 in the sleeve 210 by referencing the level 204, so that the articulating leveling system 201 is level along a plane horizontal with the earth's surface. Leveling the articulating leveling system 201 is important because once a device is attached thereto, if the articulating leveling system 201 is not level, then it may be difficult for a user to point or target the device attached thereto. This is because if the articulating leveling system 201 is not level, the device may be misbalanced, such as the weight of the device may be shifted away from a balance point.

According to an exemplary embodiment of the present invention, the threaded device attached to the mounting bolt 207 has the ability to rotate 360 degrees, in conjunction with the 360-degree rotating ability of the second tube 206 around the first pivot joint 205 and the 360-degree rotating ability of the third tube 209 around the second pivot joint 208, the articulated leveling system 201 permits a user to reposition a device mounted on the mounting bolt 207 without having to substantially reposition the user's body with respect to the stabilizing mount 200. Exemplary embodiments of the present invention also permit a device mounted on the mounting bolt 207 to be pointed consistently directly at a target and the device be repositioned without losing direct targeting.

For example, while the articulated leveling system 201 is level along a plane horizontal with the earth's surface or parallel with the horizon, if a device mounted on the stabilizing mount 200 is pointed at an angle of 90 degrees (i.e., due east), the second tube 206, the third tube 209, and the device on the mounting bolt 207 may be manipulated and rotated to point the device at an angle of 270 degrees (i.e., due west) without the user having to reposition with respect to the stabilizing mount 200. Further, the device mounted on the stabilizing mount 200 may be pointed continuously at a target if the target is moving, and the target can be continuously maintained while rotating the device. Repositioning a user and rotating the device to follow a moving target would otherwise require the device to not be pointed continuously at the target. That is, if a device is mounted on another type of stabilizing mount, such as a tripod, a user may otherwise be required to cease having a continuous direct line of sight on a target when rotating the device by 180 degrees, but for utilizing the stabilizing mount 200 according to the present invention. Likewise, if a device is mounted on another type of stabilizing mount, such as a tripod, a user may otherwise be required to reposition relative to the stabilizing mount when rotating the device by 180 degrees, but for utilizing the stabilizing mount 200 according to the present invention.

Figure 26:
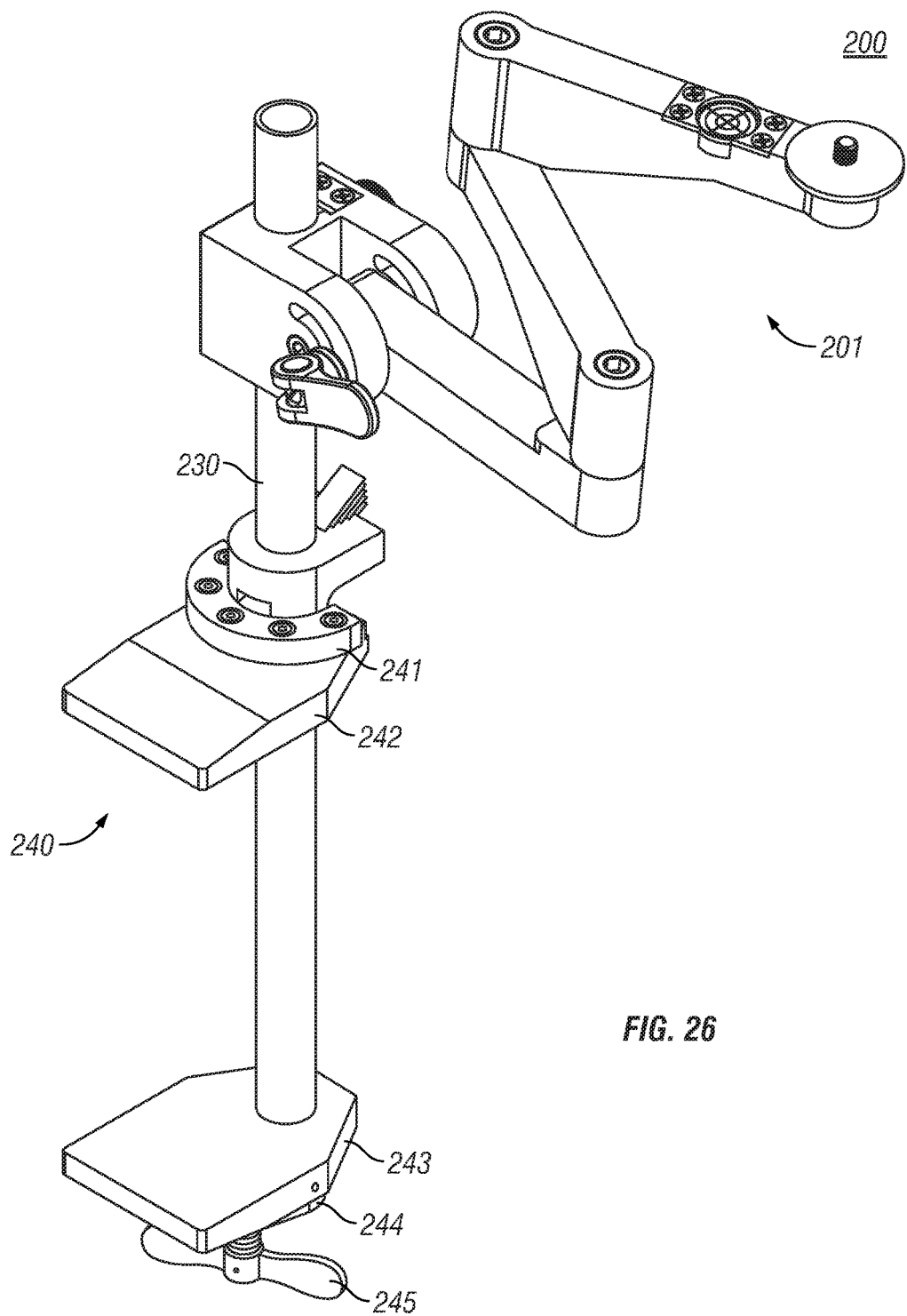
FIG. 26 is an isometric view of the stabilizing mount according to the present exemplary embodiment.

As shown in FIG. 26, the stabilizing mount 200 further includes a clamp 240 connected to the pipe 230. The clamp 240 includes a first clamp paddle 242 and a second clamp paddle 243, which may be symmetrical and respectively extend in a perpendicular direction from the extending direction of the pipe 230. A clamp paddle slide 241 is connected to the first clamp paddle 242 and is disposed between the articulated leveling system 201 and the first clamp paddle 242 along the pipe 230. The clamp paddle slide 241 is ordinarily in a "locked" position and secures the first clamp paddle 242 in place along the pipe 230, but may be adjusted by a user to move the first clamp paddle 242 along the pipe 230. The clamp paddle slide 241 may be spring-actuated, and when depressed by a user may be put in an "unlocked" position, allowing movement of the clamp paddle slide 241 and the first clamp paddle 242.

The second clamp paddle 243 is disposed at an end of the pipe 230, and is connected to a screw 245, which is threaded through a securing piece 244. Thus, the second clamp paddle 243 may be adjusted along the length of the pipe 230 by turning the screw 245. The securing piece 244 is connected to the end of the pipe 230, and prevents movement of the second clamp paddle 243 and the screw 245 along the pipe 230 when the screw 245 and the second clamp paddle 243 are not being adjusted by a user.

A user may utilize the clamp 240 to secure the stabilizing mount 200 to various surfaces, by unlocking the clamp paddle slide 241 and moving the first clamp paddle 242 along the pipe 230 to a desired position. The first clamp paddle 242 is secured on one side of an intended surface, and the second clamp paddle 243 is secured on the opposite side of the intended surface. The pipe 230 may be any length as needed by a user to secure the clamp 240 to various surfaces, and without causing physical interference between the clamp 240 and the articulated leveling system 201. For example, the pipe 230 may be of sufficient length so that the clamp 240 can be secured to the entire width of a cinder block. Likewise, the first and second clamp paddles 242 and 243 may each be of sufficient length and width so as to allow the clamp 240 to secure the stabilizing mount 200 to various surfaces.

The clamp 240 allows a user to secure the stabilizing mount 200 to various surfaces, regardless of the inclination angle thereof. Since the pitch of the articulated leveling system 201 may be adjusted by at least 180 degrees, the stabilizing mount 200, and a device attached thereto, may be made level along a plane horizontal with the earth's surface or parallel with the horizon. The articulated leveling system 201 may be inverted on the pipe 230 in order to allow the stabilizing mount 200 to be made level along a plane horizontal with the earth's surface or parallel with the horizon, depending on the inclination angle of the pipe 230 after the clamp 240 is secured to a surface.

According to an exemplary embodiment of the present invention, the clamp 240 may be used to create a fourth pivot joint for the stabilizing mount 200. Specifically, when the sleeve 210 of the articulated leveling system 201 is disposed on the clamp paddle slide 241, and the locking mechanism 211 is not locked, then the sleeve 210 may rotate freely 360 degrees around the pipe 230. The fourth pivot point may be useful for increasing the length by which the articulated leveling system 201 permits the attached device to extend in a straight line while being pointed at a target. Specifically, if a user wants to push the device forward or pull the device backward along a straight line while continuously aimed at a target, the distance by which a user may do so is increased when employing the fourth pivot joint, compared to utilizing the articulated leveling system 201 having only three pivot joints.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A stabilizing mount, comprising:
a cylindrical element;
a leveling system adjustably connected to the cylindrical element, the leveling system comprising:
   a sleeve adjustably connected to the cylindrical element via a locking mechanism, wherein the sleeve is configured to be adjusted 360 degrees about the cylindrical element,
   wherein the sleeve comprises:
      a main body portion continuous along a width direction of the sleeve, wherein the main body portion includes a first bore for accommodating the cylindrical element, wherein the main body portion includes a second bore arranged perpendicularly to the first bore in a side of the main body portion;
      a first sleeve arm extending from the main body portion, wherein the first sleeve arm includes a first hole formed therethrough and a first counter-sunk portion surrounding the first hole of the first sleeve arm; and
      a second sleeve arm extending from the main body portion, wherein the second sleeve arm includes a first hole formed therethrough and a first counter-sunk portion surrounding the first hole of the second sleeve arm;
   wherein the main body portion, the first sleeve arm, and the second sleeve arm together define a space;
   wherein the locking mechanism comprises:
      a locking block disposed in the main body portion;
      a pad disposed in the main body portion and arranged between the locking block and the cylindrical element, wherein the pad conforms to a shape of the cylindrical element; and
      a bolt partially disposed in the second bore of the main body portion, wherein the bolt of the locking mechanism includes a knob at an end thereof;
   wherein the locking block and the pad extend along a height of the sleeve;
a first tube arm adjustably connected to the sleeve,
   wherein a first end portion of the first tube arm is disposed in the space defined by the main body portion, the first sleeve arm, and the second sleeve arm;
   wherein the first tube arm is coupled to a first connector disposed through the first sleeve arm and the second sleeve arm;
   wherein the first tube arm is configured to be adjusted at least 180 degrees about the first connector;
   wherein the first connector includes:
      a first end portion disposed in the first counter-sunk portion of the first sleeve arm; and
      a nut substantially disposed in the first counter-sunk portion of the second sleeve arm;

a second tube arm adjustably connected to the first tube arm, wherein the second tube arm is configured to be adjusted 360 degrees about a first pivot joint in the first tube arm;

a third tube arm adjustably connected to the second tube arm, wherein the third tube arm is configured to be adjusted 360 degrees about a second pivot joint in the second tube arm; and a mount connector connected to the third tube arm.

2. The stabilizing mount of claim 1, further comprising:
a first clamp paddle adjustably connected to the cylindrical element; and
a second clamp paddle connected to the cylindrical element between the first clamp paddle and the leveling system;
wherein the first clamp paddle, the second clamp paddle, and the cylindrical element together form a clamping structure.

3. The stabilizing mount of claim 1, wherein the first sleeve arm further comprises a second hole formed therethrough such that the first sleeve arm comprises only two holes formed therethrough; and
wherein the second sleeve arm further comprises a second hole formed therethrough such that the second sleeve arm comprises only two holes formed therethrough.

4. The stabilizing mount of claim 1, wherein the first sleeve arm further comprises a second hole formed therethrough, the second hole of the first sleeve arm is disposed between an end of the first sleeve arm and the first hole of the first sleeve arm, the second hole of the first sleeve arm comprises a curved arcuate slot, and the end of the first sleeve arm comprises a curved edge substantially parallel to the second hole of the first sleeve arm;
wherein the second sleeve arm further comprises a second hole formed therethrough, the second hole of the second sleeve arm is disposed between an end of the second sleeve arm and the first hole of the second sleeve arm, the second hole of the second sleeve arm comprises a curved arcuate slot, and the end of the second sleeve arm comprises a curved edge substantially parallel to the second hole of the second sleeve arm;
wherein the first end portion of the first tube arm comprises a first hole and a second hole;
wherein the first connector is disposed through the first hole of the first sleeve arm, the first hole of the first end portion of the first tube arm, and the first hole of the second sleeve arm;
wherein the leveling system further comprises a second connector disposed through the second hole of the first sleeve arm, the second hole of the first end portion of the first tube arm, and the second hole of the second sleeve arm; and
wherein the second connector is configured to move within the second hole of the first sleeve arm and the second hole of the second sleeve arm.

5. The stabilizing mount of claim 4, wherein the second sleeve arm further comprises a second counter-sunk portion surrounding the second hole of the second sleeve arm; and
wherein the second connector comprises a friction connector, and a portion of the friction connector is disposed in the second counter-sunk portion of the second sleeve arm.

6. The stabilizing mount of claim 5, wherein the second connector further comprises a cam lever; and
wherein the cam lever is configured to lock a position of the first tube arm with respect to the sleeve.

7. The stabilizing mount of claim 1, wherein the main body portion, the first sleeve arm, and the second sleeve arm together define substantially planar side surfaces extending along a length direction of the sleeve; and
wherein the length direction of the sleeve is substantially perpendicular to the width direction of the sleeve.

* * * * *